US010935486B2

(12) United States Patent
Johnston et al.

(10) Patent No.: US 10,935,486 B2
(45) Date of Patent: Mar. 2, 2021

(54) ENVIRONMENTAL TEST CHAMBER

(71) Applicant: Weiss Technik North America, Inc., Grand Rapids, MI (US)

(72) Inventors: Stephen W. Johnston, Caledonia, MI (US); Sean D. McKendry, Alto, MI (US)

(73) Assignee: Weiss Technik North America, Inc., Grand Rapids, MI (US)

(*) Notice: Subject to any disclaimer, the term of this patent is extended or adjusted under 35 U.S.C. 154(b) by 158 days.

(21) Appl. No.: 15/549,295

(22) PCT Filed: Feb. 15, 2017

(86) PCT No.: PCT/IB2017/050847
§ 371 (c)(1),
(2) Date: Aug. 7, 2017

(87) PCT Pub. No.: WO2017/141174
PCT Pub. Date: Aug. 24, 2017

(65) Prior Publication Data
US 2018/0067039 A1   Mar. 8, 2018

Related U.S. Application Data

(60) Provisional application No. 62/307,887, filed on Mar. 14, 2016, provisional application No. 62/295,691, filed on Feb. 16, 2016.

(51) Int. Cl.
*G01N 17/00* (2006.01)
*F25D 9/00* (2006.01)
*F25B 1/00* (2006.01)
*F24F 3/044* (2006.01)

(52) U.S. Cl.
CPC ............. *G01N 17/002* (2013.01); *F25D 9/00* (2013.01); *F24F 3/044* (2013.01); *F25B 1/005* (2013.01)

(58) Field of Classification Search
CPC .......... G01N 17/002; F25D 9/00; F24F 3/044; F25B 1/005
(Continued)

(56) References Cited

U.S. PATENT DOCUMENTS 4,572,283 A   2/1986 Vanderschaaf
4,854,726 A * 8/1989 Lesley ................... G01N 17/00
                                                374/45
(Continued)

FOREIGN PATENT DOCUMENTS

CN          104977244       10/2015

OTHER PUBLICATIONS

International Search Report of the International Searching Authority from corresponding Patent Cooperation Treaty (PCT) Application No. PCT/IB2017/050847, indicated completed on Apr. 26, 2017.
(Continued)

*Primary Examiner* — Nimeshkumar D Patel
*Assistant Examiner* — Nashmiya S Fayyaz
(74) *Attorney, Agent, or Firm* — Gardner, Linn, Burkhart & Ondersma LLP

(57) ABSTRACT

An environmental test chamber, and method of providing an environmental test chamber, includes combining an equipment module made up of an equipment housing and air treatment equipment in the equipment housing with a selected one or more of a plurality of chamber modules connected with the equipment module to provide the environmental test chamber. The equipment housing includes an opening defining an airflow passage and an airflow path extending to the airflow passage. The air treatment equipment includes air moving equipment flowing air along the airflow path through the airflow passage and air-conditioning equipment in the flow path. The air treatment equipment includes one or more of (i) heating equipment for selectively
(Continued)

heating the flowing air, (ii) cooling equipment for selectively cooling the flowing air, (iii) humidification equipment for selectively humidifying the flowing air, and/or (iv) dehumidification equipment for selectively dehumidifying the flowing air. A plurality of chamber modules of different sizes from each other are provided. Each of the chamber modules has a chamber housing with an opening defining an airflow passage in the chamber housing that aligns with the airflow opening in the equipment module and an access opening that is selectively opened for accessing an interior of the chamber module. In this manner, the one or ones of the chamber modules that is connected with the equipment module determines a configuration of the environmental test chamber.

16 Claims, 13 Drawing Sheets

(58) Field of Classification Search
USPC ....................................................... 73/865.6
See application file for complete search history.

(56) References Cited

U.S. PATENT DOCUMENTS

| | | | | |
|---|---|---|---|---|
| 5,851,143 | A * | 12/1998 | Hamid | G01N 17/002 454/57 |
| 5,974,902 | A | 11/1999 | Scofield | |
| 6,113,262 | A | 9/2000 | Purola et al. | |
| 6,272,767 | B1 * | 8/2001 | Botruff | B01L 1/00 34/202 |
| 8,616,063 | B2 * | 12/2013 | Provost | G01M 99/002 73/663 |
| 2003/0172751 | A1 * | 9/2003 | Frannhagen | B01L 7/00 73/865.6 |
| 2005/0145047 | A1 * | 7/2005 | Frannhagen | B01L 7/00 73/865 |
| 2006/0021246 | A1 | 2/2006 | Schulze et al. | |
| 2010/0154571 | A1 | 6/2010 | Yun et al. | |
| 2012/0297904 | A1 | 11/2012 | Pickel | |
| 2013/0025381 | A1 * | 1/2013 | Luo | G06F 11/2273 73/865.6 |
| 2014/0341253 | A1 | 11/2014 | Kobayashi et al. | |
| 2015/0355074 | A1 * | 12/2015 | Zhou | G01N 3/567 374/57 |
| 2017/0010313 | A1 * | 1/2017 | How | G01R 31/003 |
| 2019/0025188 | A1 * | 1/2019 | Weppler | G01N 17/002 |

OTHER PUBLICATIONS

Written Opinion of the International Searching Authority from corresponding Patent Cooperation Treaty (PCT) Application No. PCT/IB2017/050847, indicated completed on Apr. 26, 2017.
United States Statutory Invention Registration, Registration No. H229 (Phillips), Registration Date: Mar. 3, 1987.

* cited by examiner

ENVIRONMENTAL TEST CHAMBER

CROSS REFERENCE TO RELATED APPLICATIONS

The present application is a 371 national phase application of PCT Application No. PCT/US2016/050847, filed Feb. 15, 2017, which claims priority to U.S. provisional patent application Ser. No. 62/295,691 filed Feb. 16, 2016, and U.S. provisional patent application Ser. No. 62/307,887 filed Mar. 14, 2016, the disclosures of which are hereby incorporated herein by reference in their entirety.

BACKGROUND OF THE INVENTION

The present invention is directed to an environmental test chamber and method of making such a test chamber.

Environmental test chambers are used, for example, to qualify a piece of equipment as being capable of withstanding a variety of environmental conditions. One such type of environmental test chamber subjects the equipment to a wide range of temperatures and relative humidities to simulate real life transportation and use conditions. If the equipment under test performs satisfactorily after being subjected to the wide range of temperatures and relative humidities, it can be expected that the equipment will perform in real life conditions.

SUMMARY OF THE INVENTION

An environmental test chamber, and method of providing an environmental test chamber, according to an aspect of the invention, includes an equipment module made up of an equipment housing and air treatment equipment in the equipment housing with a selected one of a plurality of chamber modules connected with the equipment module to provide the environmental test chamber. The equipment housing includes an opening defining an airflow passage and an airflow path extending to the airflow passage. The air treatment equipment includes air moving equipment flowing air along the airflow path through the airflow passage and air-conditioning equipment in the flow path. The air treatment equipment includes one or more of (i) heating equipment for selectively heating the flowing air, (ii) cooling equipment for selectively cooling the flowing air, (iii) humidification equipment for selectively humidifying the flowing air, and/or (iv) dehumidification equipment for selectively dehumidifying the flowing air. A plurality of chamber modules, at least some of different sizes from each other, are provided. Each of the chamber modules has a chamber housing with an opening defining an airflow passage in the chamber housing that aligns with the airflow opening in the equipment module and an access opening that is selectively opened for accessing an interior of the chamber module. In this manner, the one or ones of the chamber modules that is (are) connected with the equipment module determines a configuration of the environmental test chamber.

A plurality of fasteners, such as hand-operable fasteners, on the equipment module and/or chamber module may be provided to releasably fasten one of the chamber modules with the equipment module. A door module may be provided that is selectively mounted over the access opening of one of chamber modules. In this manner, a plurality of chamber modules can be connected together with the equipment module with the access opening of the chamber module adjacent to the equipment module supplying flowing air to the chamber module further from the equipment module and the door module over the access opening of the chamber module further from the equipment module.

A transition module may be provided between the equipment module and one of the chamber modules. The transition module adapts the airflow passage in the equipment module with the airflow passage in the chamber module. A sealing gasket may be provided between the equipment module and chamber module around the airflow passages to seal the airflow passages. At least one of the chamber modules may be a walls-in chamber. More than one of the chamber modules may be connected with the equipment module.

The present invention allows an environmental test chamber to be used to conduct environmental testing on a large variety of equipment under test without the need to custom manufacture a large number of environmental test chamber configurations. Also, a user of the environmental test chamber could keep a number of different chambers of different configurations in stock and interchange them with the equipment module for different applications. Also, chamber modules may be provided on a temporary basis to an owner of an equipment module in order to minimize installed equipment cost.

These and other objects, advantages and features of this invention will become apparent upon review of the following specification in conjunction with the drawings.

DESCRIPTION OF THE PREFERRED EMBODIMENT

Figure 1:
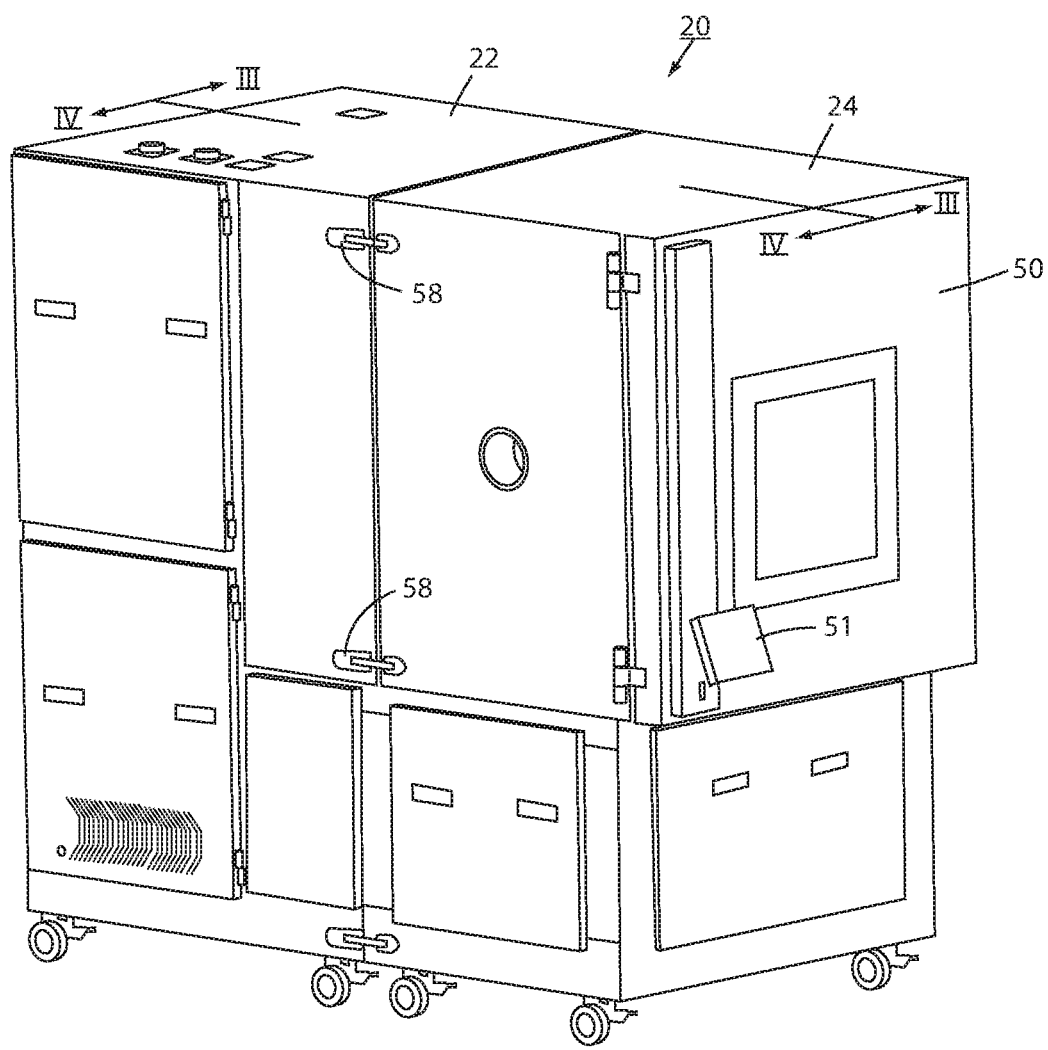
FIG. 1 is a perspective view taken from the top front left side showing an environmental test chamber, according to an embodiment of the invention.
Figure 2:
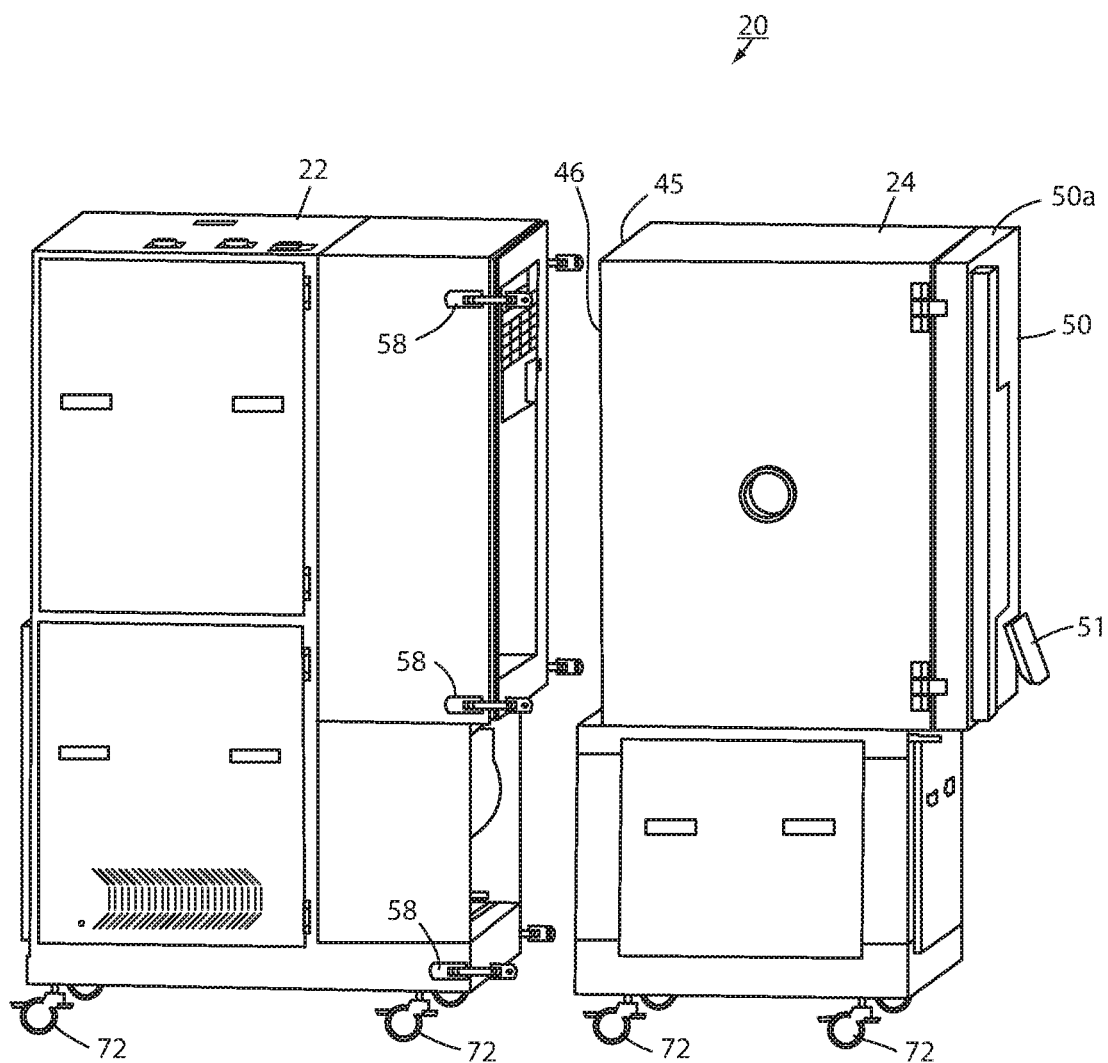
FIG. 2 is a perspective view showing the equipment module and chamber module making up the environmental test chamber in FIG. 1 separated from each other.
Figure 2A:
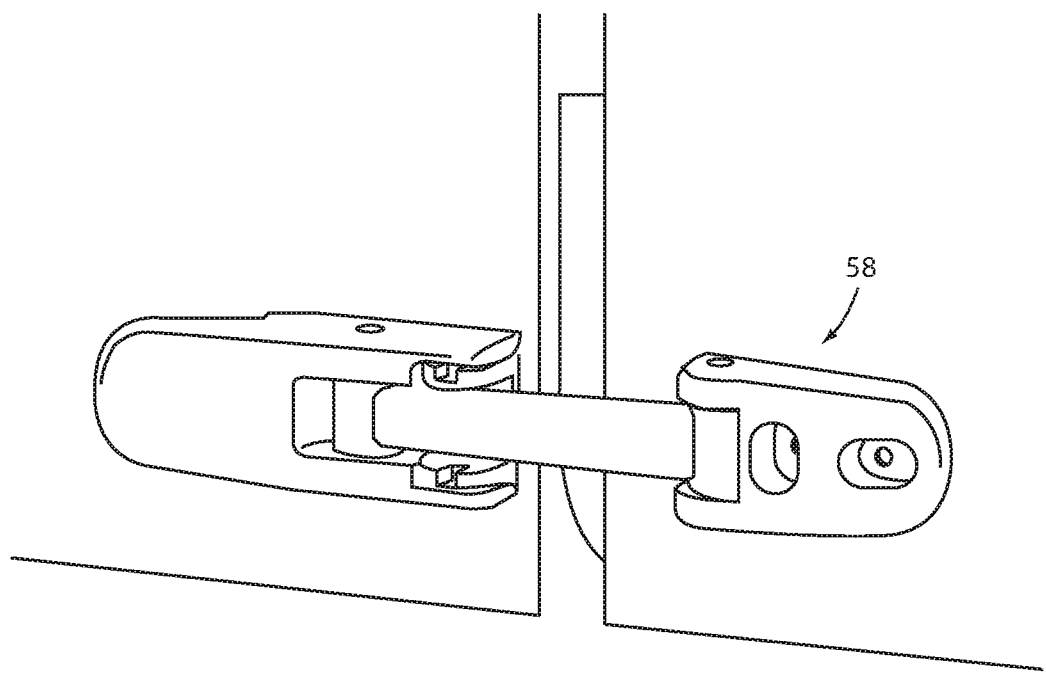
FIG. 2a is a perspective view of a latch.
Figure 3:
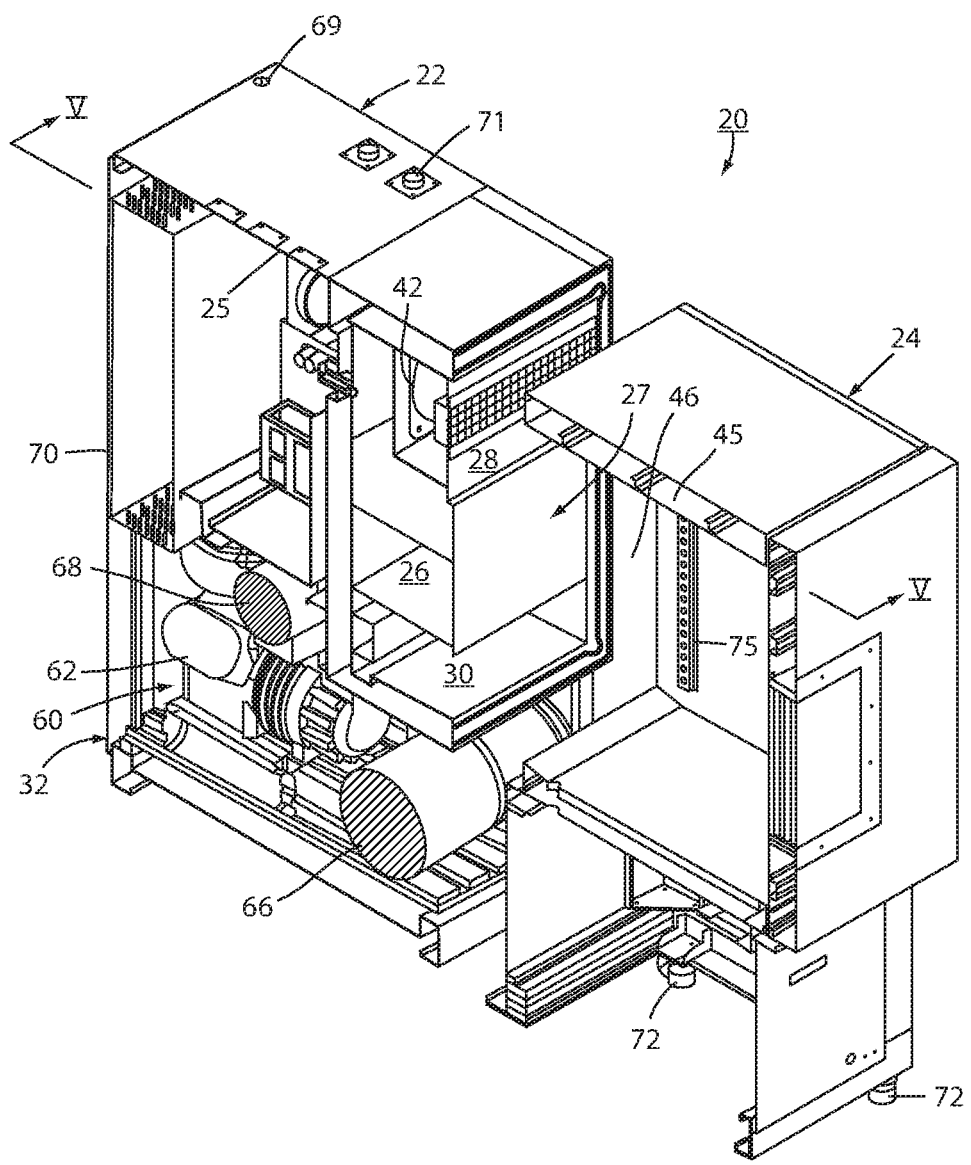
FIG. 3 is a sectional view taken along the lines III-III in FIG. 1 with modules 22 and 24 separated to better reveal details of their interface.
Figure 4:
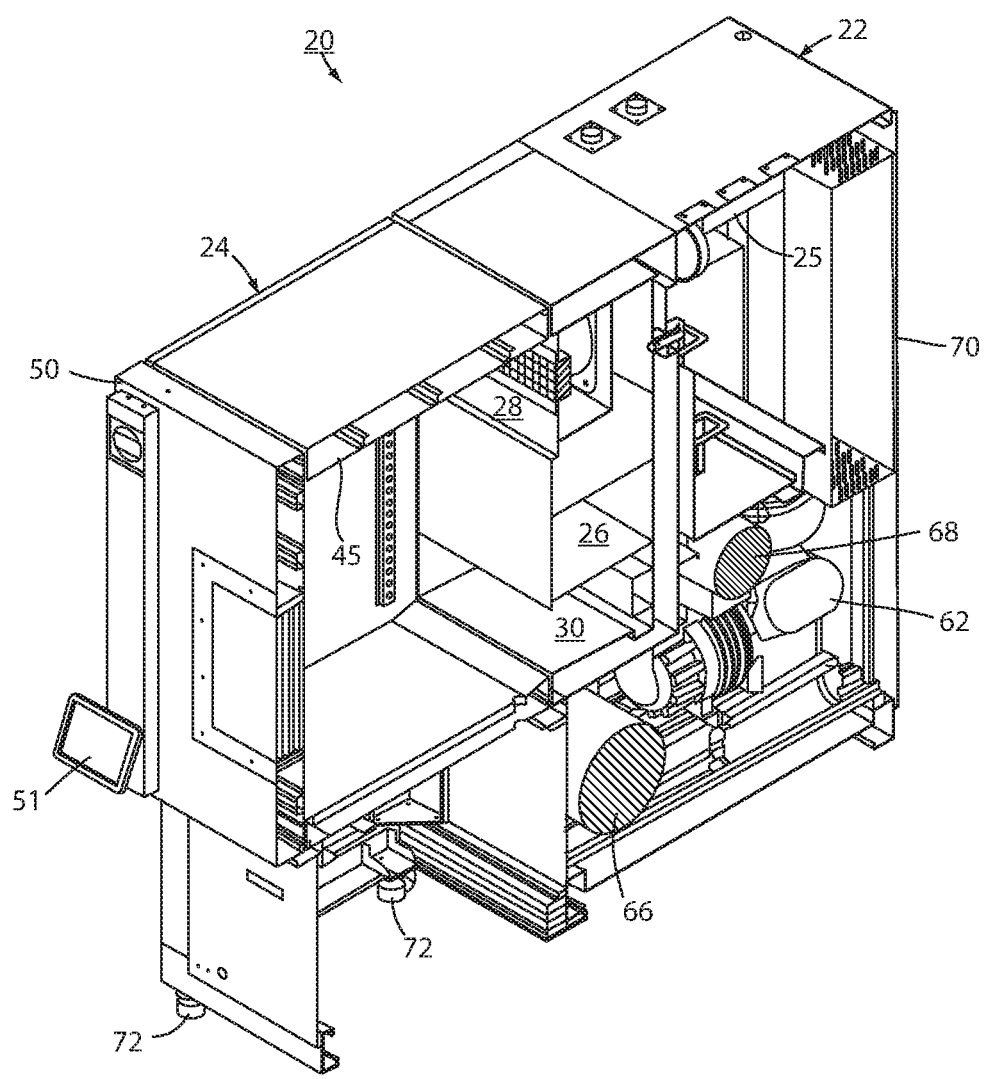
FIG. 4 is a sectional view taken along the lines IV-IV in FIG. 1.
Figure 5:
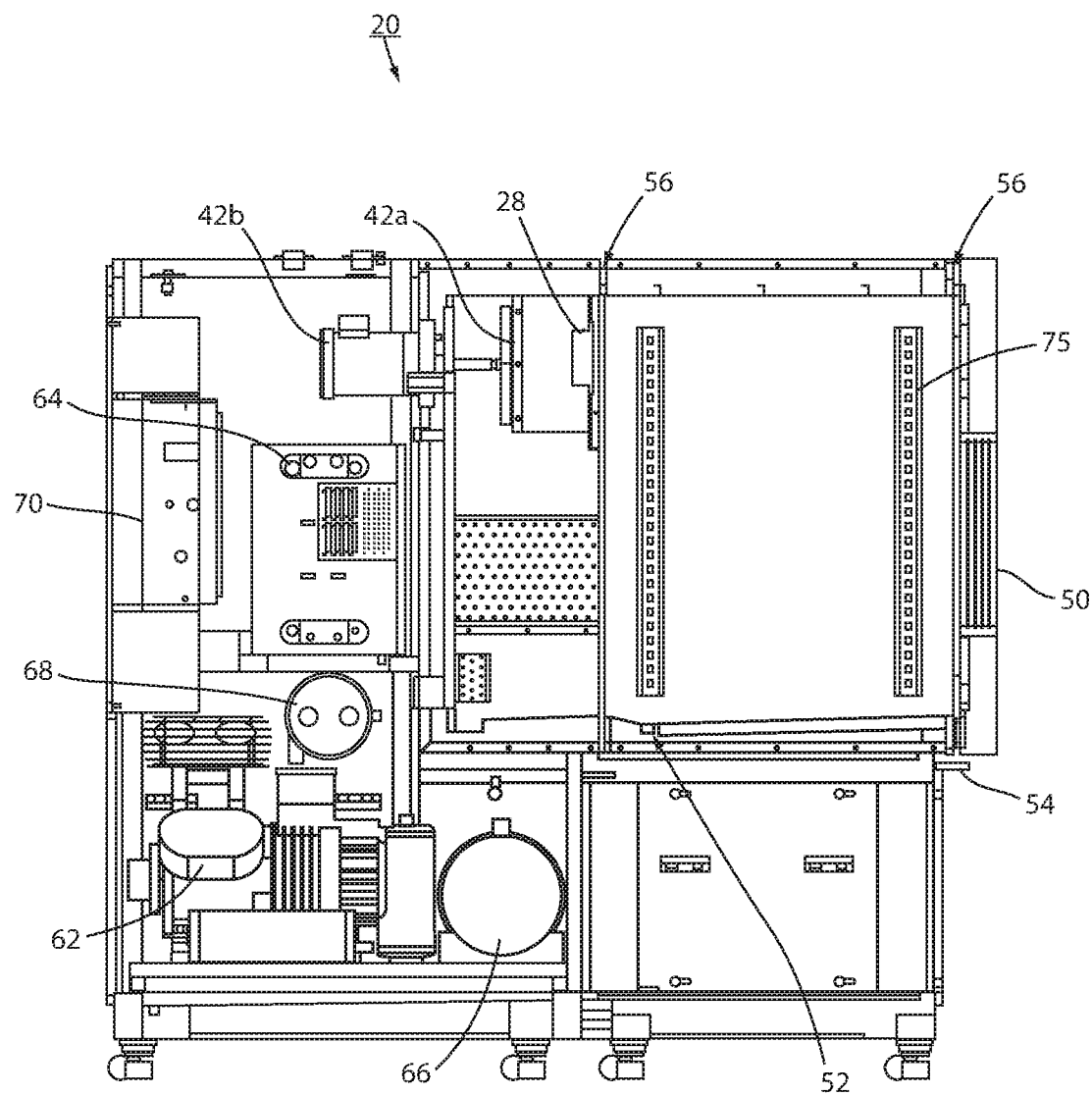
FIG. 5 is a side elevation view taken in the direction V-V in FIG. 3.

Referring now to the drawings and the illustrative embodiment depicted therein, an environmental test chamber 20 includes an equipment module 22 and at least one chamber module 24 (FIG. 1). The chamber module 24 is selected from a plurality of chamber modules (24a, 24b, 24c . . . 24n) that are of different sizes from each other. Equipment module 22 includes an equipment housing 25 and air treatment equipment 32 in housing 25. Housing 25 includes an opening 27 defining an airflow passage having a discharge airflow passage 28 and a return airflow passage 30 vertically separated from each other. An airflow path 26 is defined by a series of sheet metal walls between its discharge airflow passage 28 and return passages 30. Air treatment equipment 32 includes air-moving equipment 42 in the form of one or more axial flow fans 42a driven by electric motors 42b flowing air along airflow path 26 through opening 27.

Figure 6:
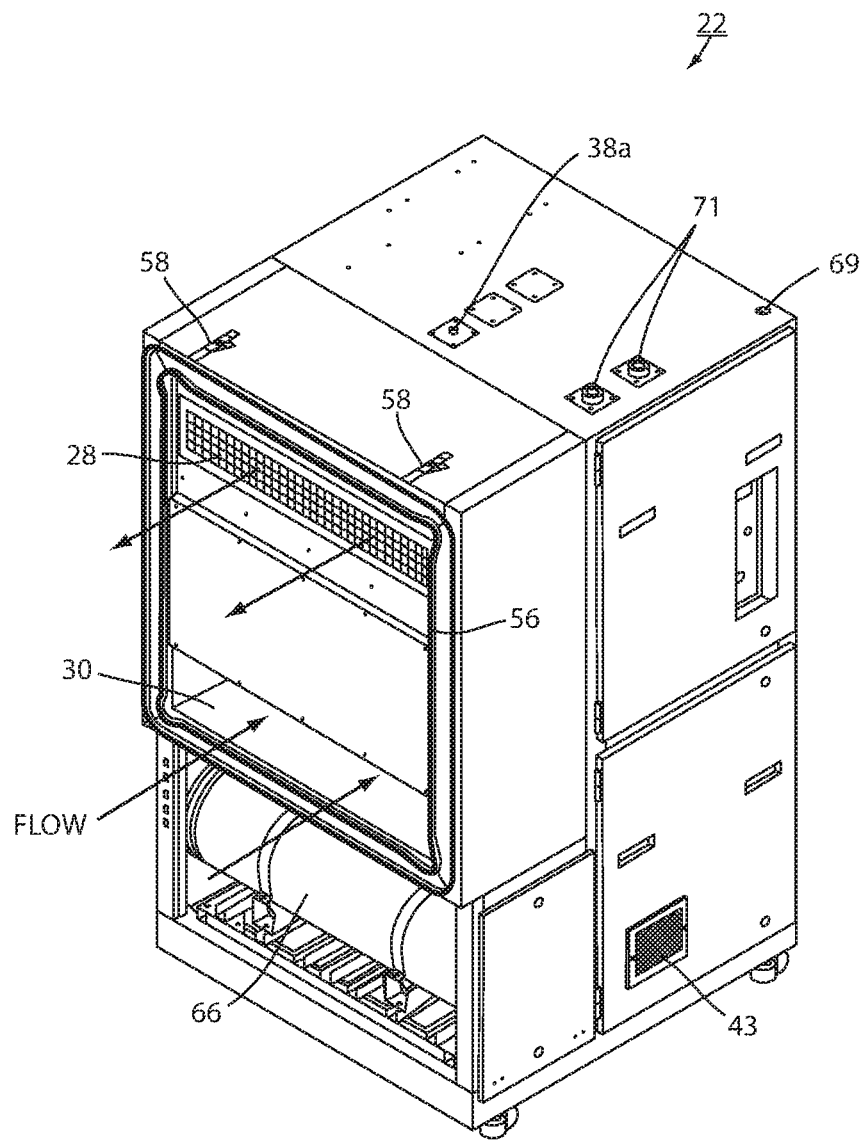
FIG. 6 is a perspective view taken from the top front right side of an equipment module.
Figure 7:
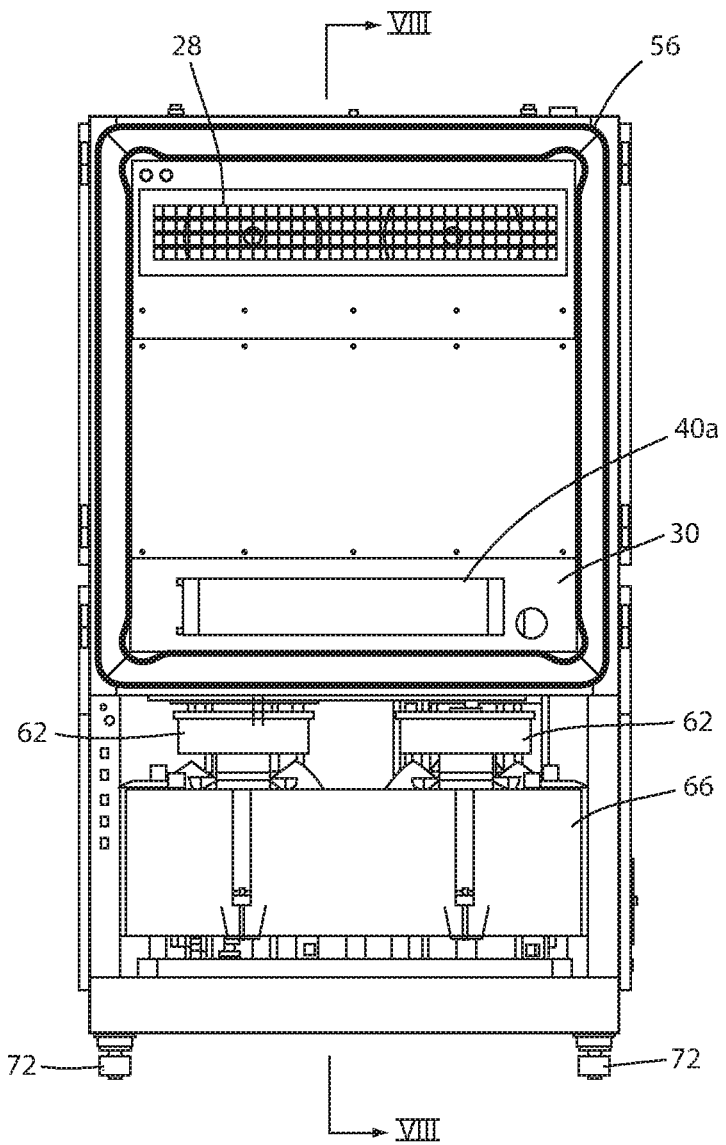
FIG. 7 is a front elevation view of the equipment module in FIG. 6.
Figure 8:
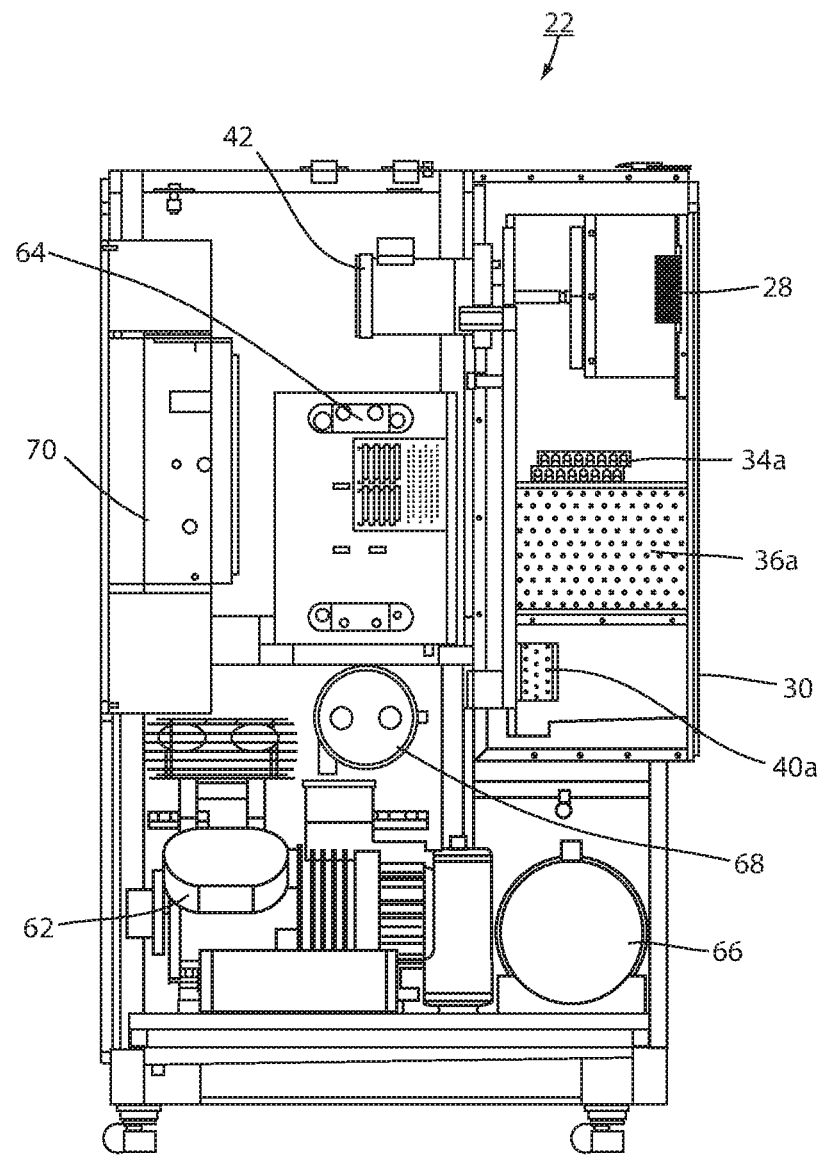
FIG. 8 is a sectional view taken along the lines VIII-VIII in FIG. 7.

Air treatment equipment, in the illustrated embodiment, includes air-conditioning equipment in the flow path in the form of heating equipment for selectively heating the flowing air, cooling equipment for selectively cooling the flowing air, humidification equipment for selectively humidifying the flowing air and/or dehumidification equipment for selectively dehumidifying the flowing air. The heating equipment is in the form of an electric heater 34a. Cooling equipment is in the form of an evaporative coil 36a supplied with refrigerant. The humidification equipment is in the form of a humidity water inlet 38a (shown in FIG. 6), which supplies water to an evaporative heater (not shown) or atomizing system (not shown), or the like, that discharges steam though an outlet (not shown) to airflow path 26. The dehumidification equipment is in the form of an evaporator 40a in airflow path 26. It should be understood that some, but not necessarily all, of the air treatment equipment may be used in each particular system.

A refrigeration system 60 includes one or more compressors 62 operating in high and low stage systems to supply refrigerant to evaporator coil 36a and dehumidification coil 40a. An optional heat exchanger 64 is an evaporator for the high stage refrigeration system and the condenser for the low stage refrigeration system. An optional low stage expansion tank 66 stores extra refrigerant not needed at higher temperature levels. An optional water cooled condenser 68 is provided for the high stage refrigeration system and, if used, receives cooling water through inlet and outlet 71. Alternatively, an air cooled condenser may be provided, especially if cooled water is not available. An electrical power panel 70 supplies power from a source (not shown) to air treatment equipment 32. Various equipment cooling vents 43 are provided. Power is supplied via electrical power inlet 69. Also, it should be understood that refrigeration system 60 may be supplied in various horsepower ratings. In the illustrated embodiment, the refrigeration system may be supplied within a range of between 4 hp and 15 hp although other sizes may be used. In the illustrated embodiment, temperature and humidity ranges may be from +200 degrees Centigrade to −73 degrees Centigrade and humidity from 10% to 98% relative humidity.

Chamber module 24 is selected from among a plurality of chamber modules 24a, 24b, 24c . . . 24n, each being of different sizes from the other. Each of the chamber modules 24 has a chamber housing 45 having an opening 46 defining an airflow passage to housing 25 of equipment module 22 that aligns with the airflow opening 27 in the equipment module 22. Chamber housing 45 further has an access opening 48 having a chamber door 50 that selectively opens the chamber for accessing the interior of the chamber module. Since chamber module 24 is provided in a plurality of sizes, a selected one of the chamber modules is connected with equipment module 22 to provide the environmental test chamber 20. The one of the chamber modules 24a, 24b, 24c . . . 24n that is connected with equipment module 22 determines a configuration of environmental test chamber 20. This allows environmental test chamber 20 to be used to conduct environmental testing on a large variety of equipment under test without the need to custom manufacture a large number of environmental test chamber configurations. Also, a user of the environmental test chamber could keep a number of different chambers of different configurations in stock and interchange them with the equipment module for different applications. Also, chamber modules may be provided on a temporary basis to an owner of an equipment module in order to minimize installed equipment cost.

Figure 9:
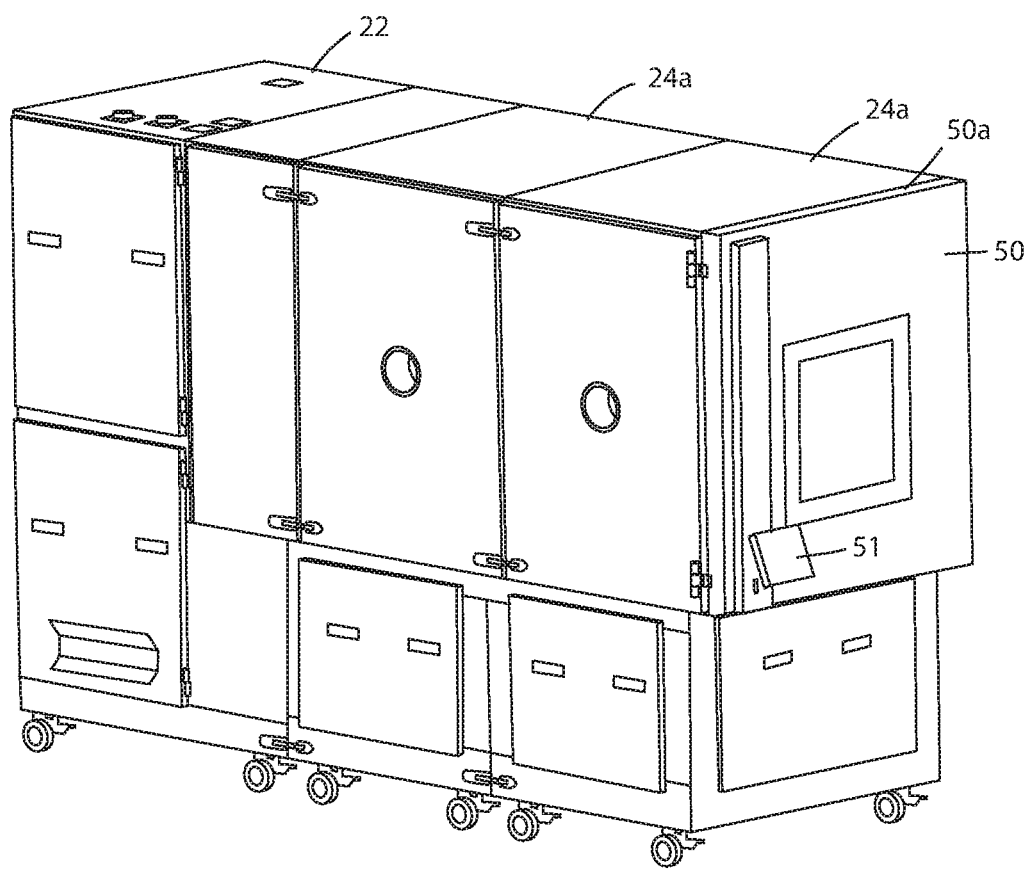
FIG. 9 is a perspective view taken from the top front left side of an environmental test chamber configuration using multiple chamber modules.

A plurality of fasteners 58 are provided on equipment module 22 and/or chamber module 24 to releasably fasten one of said chamber modules with said equipment module. While hand-operable fasteners are illustrated, other mechanically, electrically, pneumatically or hydraulically operable fasteners may be used. Although not shown, mating electrical connectors may be provided at the interface between the equipment and chamber modules to provide lighting to the chamber module, to monitor the open/closed status of door 50, to interact with a control panel/display 51, and the like. Also, feet, such as casters 72, may be provided for each of the equipment and chamber modules to provide easy interchange of the chamber module with the equipment module. Door 50 may be provided as a door module 50a that is selectively mounted over access opening 48 of one of the chamber modules. In this manner, an environmental test chamber 20a includes a plurality of chamber modules 24a that can be connected together in tandem with equipment module 22 with the access opening of the chamber module adjacent to the equipment module supplying flowing air to the chamber module further from the equipment module and the door module over the access opening of the chamber module further from the equipment module as illustrated in FIG. 9. Shelf brackets 75 allow for adjustably placed equipment support shelves.

Figure 10:
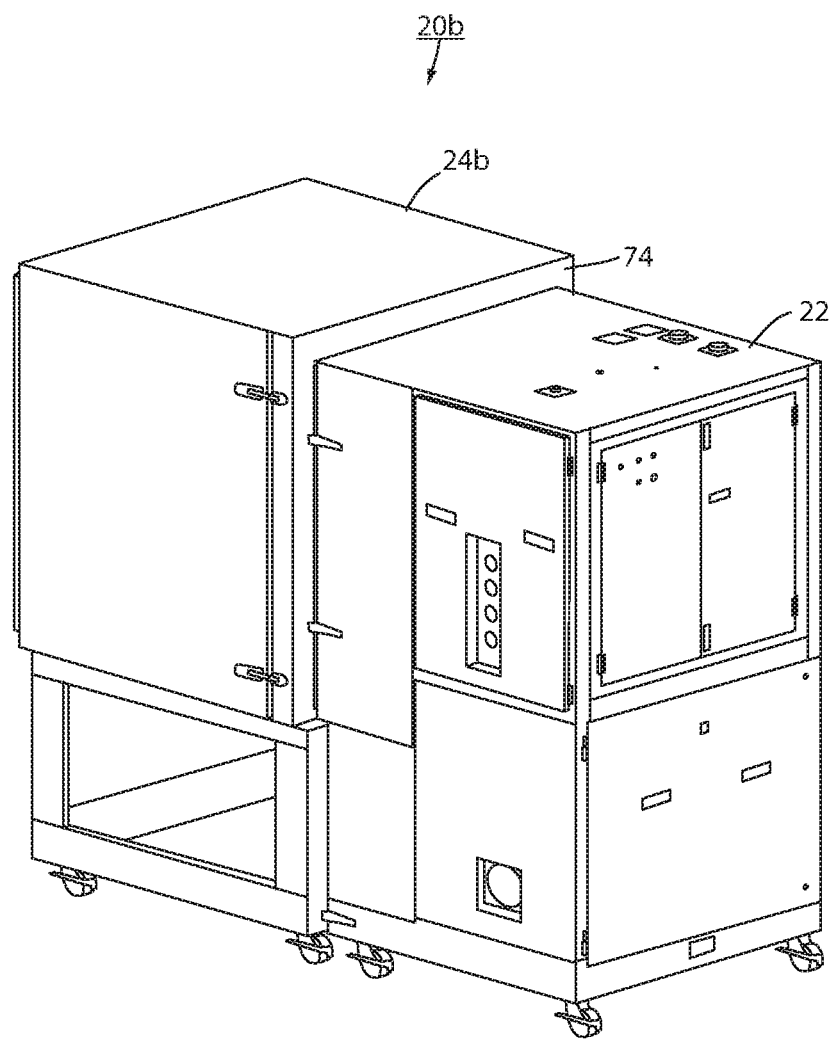
FIG. 10 is a perspective view taken from the top rear right side showing an environment test chamber alternative configuration.
Figure 11:
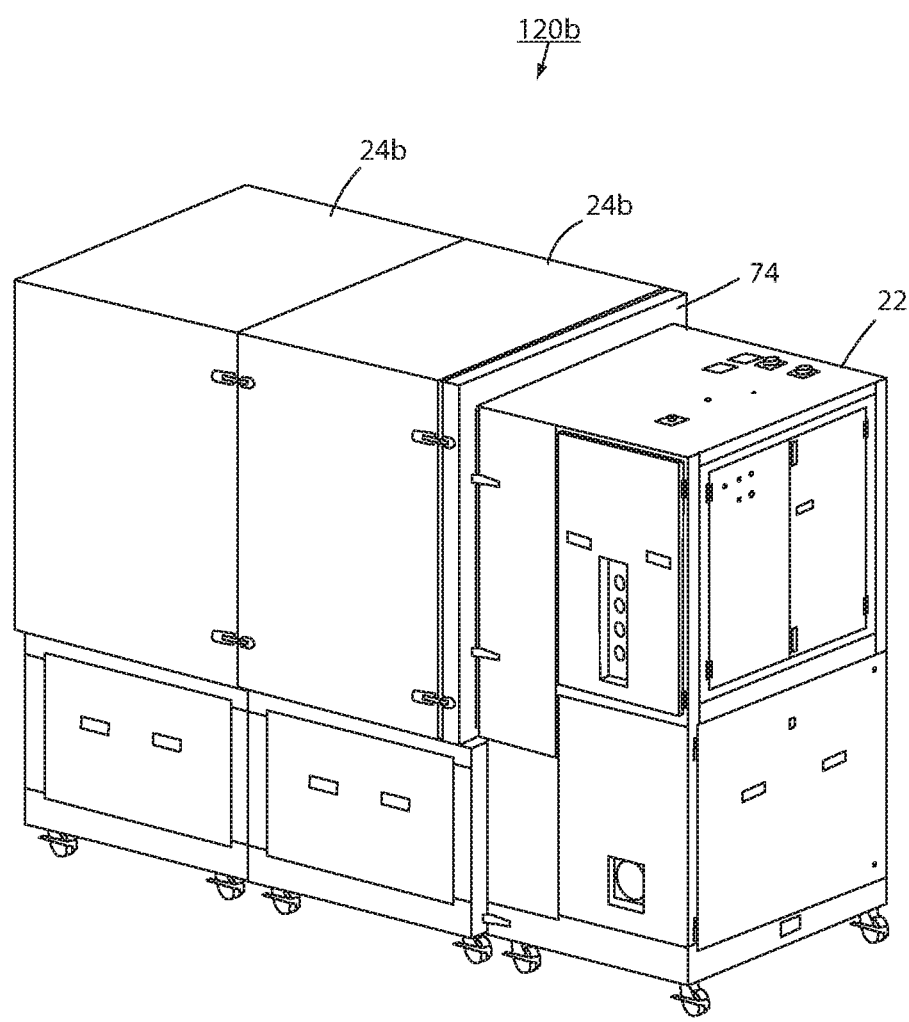
FIG. 11 is a perspective view taken from the top rear right side showing an environmental test chamber alternative configuration using multiple chamber modules.
Figure 12:
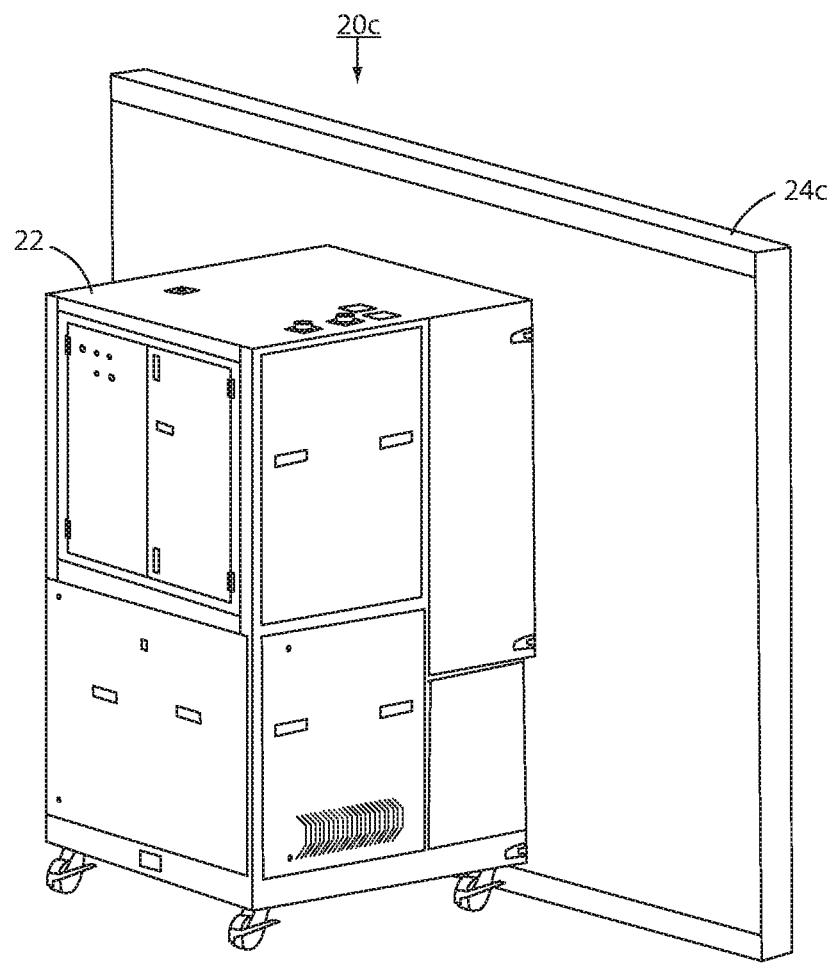
FIG. 12 is a perspective view taken from the top rear left side showing an environmental test chamber alternative configuration.

In some configurations of environmental test chamber 20b, a chamber module 24b may be provided having an airflow passage that is larger than equipment module 22. In such combination illustrated in FIG. 10, a transition module 74 may be positioned between equipment module 22 and chamber module 24b. Transition module 74 adapts the airflow passage in equipment module 22 with the airflow passage in the chamber module 24b. FIG. 11 illustrates an environmental test chamber 120b that uses transition module 74 with multiple tandem chamber modules 24b. A sealing gasket 56 having inner and outer sealing sections is provided between equipment module 22 and chamber module 24a, 24b, 24c . . . 24n around flow passages 28, 30 and 46 in order to seal the airflow passages to avoid escape of air outside of environmental test chamber 20. A sealing gasket 56 may also provide for airtight closure of door 50. One of chamber modules may be a walk-in chamber 24c that extends to the floor and includes a door (not shown) that is large enough to walk in (FIG. 12) to provide a walk-in environmental test chamber 20c.

A work space drain 52 may be provided to remove any condensate from the chamber module. A door drain 54 may be provided to remove any condensate from within door 50. Also, other equipment may be provided within a chamber. For example, a vibration-generating device, such as a vibration shaker, can be provided in a chamber module to allow vibration testing to be performed at a variety of temperature and/or humidity levels. Also, when multiple chamber modules are connected in tandem, an equipment mover may be used to move the unit under test between the chamber modules. Each of the modules could be maintained at a different temperature in order to perform a thermal shock test. Other applications will be apparent to the person skilled in the art.

Thus, it is seen that an environmental test chamber 20 is provided having an equipment module made up of an equipment housing and air treatment equipment in the equipment housing combined with a selected one or more chamber modules of various sizes. The chamber module(s) is connected with the equipment module to provide the environmental test chamber and wherein the one of the chamber module(s) that is connected with said equipment module determines a configuration of the environmental test chamber.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A method of making an environmental test chamber, comprising:
    having an equipment module comprising an equipment housing and air treatment equipment in said equipment housing, said housing including an opening defining a discharge airflow passage and an airflow path extending to said discharge airflow passage, said air treatment equipment including air-moving equipment flowing air along said airflow path through said discharge airflow passage and air-conditioning equipment in the flow path, said air conditioning equipment comprising at least one chosen from (i) heating equipment that is adapted to selectively heat the flowing air, (ii) cooling equipment that is adapted to selectively cool the flowing air, (iii) humidification equipment that is adapted to selectively humidify the flowing air, and (iv) dehumidification equipment that is adapted to selectively dehumidify the flowing air;
    having a plurality of chamber modules, at least some of said chamber modules being of different sizes from each other, each of said chamber modules having a chamber housing with an opening in one of the chamber housing walls in said chamber housing that aligns with the discharge airflow passage in the equipment module when the one of said chamber walls abuts with said one of said equipment housing walls, said chamber housing having an access opening that is selectively opened for accessing an interior of said chamber housing; and
    selecting one of said chamber modules that is suitable to house equipment under test and separately connecting said one of said chamber modules with said equipment module with the opening in one of the chamber housing walls of the one of said chamber modules connected with the discharge airflow passage of said equipment module thereby supplying flowing air to the selected one of the chamber modules from the equipment module and a door over the access opening of the one of said chamber modules and wherein the one of said chamber modules connected with said equipment module establishing a configuration of the environmental test chamber.

2. The method of making an environmental test chamber as claimed in claim 1 including a plurality of fasteners on at least one of said equipment module and chamber modules and wherein said separately connecting includes releasably fastening one of said chamber modules with said equipment module using said fasteners.

3. The method of making an environmental test chamber as claimed in claim 1 including connecting a transition module between said equipment module and the one of said chamber modules said transition module adapting the discharge airflow passage in the equipment module with the opening in one of the chamber housing walls in the one of said chamber modules.

4. The method of making an environmental test chamber as claimed in claim 1 including sealing said discharge airflow passage with a sealing gasket between said equipment module and said one of said chamber modules around said discharge airflow passages.

5. The method of making an environmental test chamber as claimed in claim 1 wherein at least one of said chamber modules comprises a walk-in chamber.

6. The method of making an environmental test chamber as claimed in claim 1 wherein said air conditioning equipment comprising at least two chosen from (i) said heating equipment, (ii) said cooling equipment, (iii) said humidification equipment, and (iv) said dehumidification equipment.

7. The method of making an environmental test chamber as claimed in claim 6 wherein said air conditioning equipment comprising at least three chosen from (i) said heating equipment, (ii) said cooling equipment, (iii) said humidification equipment, and (iv) said dehumidification equipment.

8. An environmental test chamber, comprising:
    an equipment module comprising an equipment housing having a plurality of walls and air treatment equipment in said equipment housing, said housing including an opening in one of said equipment housing walls defining a discharge airflow passage, said air treatment equipment including air-moving equipment flowing air along an airflow path through said discharge airflow passage and air-conditioning equipment in the airflow path, said air conditioning equipment comprising at least one chosen from (i) heating equipment that is adapted to selectively heat the flowing air, (ii) cooling equipment that is adapted to selectively cool the flowing air, (iii) humidification equipment that is adapted to selectively humidify the flowing air, and (iv) dehumidification equipment that is adapted to selectively dehumidify the flowing air;
    a plurality of chamber modules, at least some of said chamber modules being of different sizes from each other, each of the chamber modules having a chamber housing having a plurality of walls and an opening in one of said chamber housing walls that is configured to align with the discharge airflow passage in the equipment module when the one of said chamber walls abuts with said one of said equipment housing walls, said chamber housing having an access opening that is selectively opened to provide accessing an interior of said chamber housing; and a selected one of said chamber modules that is suitable to house equipment under test is separably connected with said equipment module with the opening in one of said chamber housing walls of the selected one of said chamber modules connected with the discharge airflow passage of said equipment module thereby supplying flowing air to the selected one of the chamber modules from the equipment module and a door over the access opening of the selected one of said chamber modules and wherein the selected one of said chamber modules connected with said equipment module establishing a configuration of the environmental test chamber.

9. The environmental test chamber as claimed in claim 8 including a plurality of fasteners on said equipment module and said chamber modules that are adapted to releasably connect said chamber modules with said equipment module.

10. The environmental test chamber as claimed in claim 9 including a sealing gasket between said equipment module and said one of said chamber modules around said discharge airflow passage to seal said discharge airflow passages.

11. The environmental test chamber as claimed in claim 8 including a sealing gasket between said equipment module and said one of said chamber modules around said discharge airflow passage to seal said discharge airflow passages.

12. The environmental test chamber as claimed in claim 8 wherein one of said chamber modules comprises a walk-in chamber.

13. The environmental test chamber as claimed in claim 8 wherein said air conditioning equipment comprising at least two chosen from (i) said heating equipment, (ii) said cooling equipment, (iii) said humidification equipment, and (iv) said dehumidification equipment.

14. The environmental test chamber as claimed in claim 13 wherein said air conditioning equipment comprising at least three chosen from (i) said heating equipment, (ii) said cooling equipment, (iii) said humidification equipment, and (iv) said dehumidification equipment.

15. The environmental test chamber as claimed in claim 8 wherein said opening in one of the chamber housing walls receives said discharge airflow passage from the equipment module and a return airflow passage to the equipment module.

16. The environmental test chamber as claimed in claim 8 including a transition module between said equipment module and said one of said chamber modules said transition module adapting the discharge airflow passage in the equipment module with the opening in one of the chamber housing walls in the chamber module.

* * * * *

UNITED STATES PATENT AND TRADEMARK OFFICE
CERTIFICATE OF CORRECTION

PATENT NO. : 10,935,486 B2
APPLICATION NO. : 15/549295
DATED : March 2, 2021
INVENTOR(S) : Stephen W. Johnston and Sean D. McKendry It is certified that error appears in the above-identified patent and that said Letters Patent is hereby corrected as shown below:

In the Claims

Column 6
Claim 4, Line 26, "passages" should be --passage--

Column 7
Claim 10, Line 21, "passages" should be --passage--
Claim 11, Line 25, "passages" should be --passage--

Signed and Sealed this
Thirty-first Day of January, 2023

Katherine Kelly Vidal
*Director of the United States Patent and Trademark Office*